Feb. 22, 1966  B. J. PATTON  3,236,935
ROOM SHIELDED FROM THE EFFECT OF AN AMBIENT MAGNETIC FIELD
Filed Feb. 25, 1963  3 Sheets-Sheet 1

BOBBIE J. PATTON
INVENTOR.

BY *Frederick E. Dumonlin*

ATTORNEY

BOBBIE J. PATTON
INVENTOR.

BY Frederick E. Dumoulin
ATTORNEY.

BOBBIE J. PATTON
INVENTOR.

BY Frederick E. Dumoulin
ATTORNEY.

'# United States Patent Office 3,236,935
Patented Feb. 22, 1966

3,236,935
ROOM SHIELDED FROM THE EFFECT OF AN AMBIENT MAGNETIC FIELD
Bobbie J. Patton, Dallas, Tex., assignor to Socony Mobil Oil Company, Inc., a corporation of New York
Filed Feb. 25, 1963, Ser. No. 260,668
12 Claims. (Cl. 174—35)

This invention relates to shielding and relates more particularly to an enclosed space which is shielded from the influence of an ambient magnetic field.

For many purposes, it is desirable to have an enclosed space which is free or substantially free of the ambient magnetic fieldfl. For example, in the study of rock magnetism, such space is highly useful. The magnetic field of the rock is low in intensity. On the other hand, the magnetic field of the earth is comparatively greater. Thus, in measurements of rock magnetism, the comparatively greater intensity of the magnetic field of the earth interferes with the accurate measurement of the weak magnetic field of the rock. With elimination or diminution of the earth's magnetic field, the measurements and study of the rock magnetism becomes simplified.

In other situations, it is also desirable to have an enclosed magnetic-free space. Thus, in modern space technology, it is desirable to know the intensity of the magnetic field in space. In order to measure this magnetic field, a satellite containing a magnetometer can be sent into space. However, the satellite per se has a magnetic field of its own. Thus, the magnetic field measured by the magnetometer will be the sum of the magnetic field in space and the magnetic field of the satellite. The magnetic field in space can be obtained by subtracting from this total magnetic field the magnetic field of the satellite. However, to do this, the magnetic field of the satellite has to be known. To determine the magnetic field of the satellite, the measurement has to be made in an environment free of the ambient magnetic field in order to be accurate. This measurement can be made in a space free of a magnetic field.

Various methods have been employed in the past for eliminating the influence of an ambient magnetic field. For example, bucking coil systems or small magnetic shields have been used with rock-generator type magnetometers and astatic magnet systems have been used in static magnetometers. In magnetization experiments, coil systems have been employed for reduction of the ambient field. Also, in these experiments, small shields, coil systems, and tumbling systems have been used. However, all of these are unsatisfactory from the standpoint of their cost and the extent to which they reduce the external magnetic field. They have also been unsatisfactory from the standpoint of their necessarily small size.

It is an object of this invention to provide an enclosed space which is shielded from the influence of an ambient, or external magnetic field.

It is another object of this invention to increase the size of enclosed spaces shielded from the influence of an ambient magnetic field.

It is another object of this invention to reduce the cost of an enclosed space which is shielded from the effects of the ambient magnetic field.

It is another object of this invention to provide a shielded room wherein magnetic measurements free of the influence of the earth's magnetic field may be made.

It is another object of this invention to increase the effectiveness of magnetic materials for providing shielding against external magnetic fields.

It is another object of this invention to provide magnetic continuity between separate sheets of magnetic materials in the construction of a magnetically shielded room.

It is another object of this invention to provide magnetic continuity in a door in a magnetically shielded room.

It is another object of this invention to provide a means for designing a shielded room which can be relied upon to effect the extent of shielding desired.

These and other objects of the invention will become apparent from the following detailed description.

In accordance with the invention, there is provided a cubical space formed of a ferromagnetic material. In accordance with a particular aspect of the invention, the extent to which the ambient field is diminished within the cubical space formed of a ferromagnetic material. It ac magnetic material and the length of the edge of the cube. In accordance with a more particular aspect of the invention, the thickness of the ferromagnetic material and the length of the edge of the cube is selected taking into consideration the intensity of the ambient magnetic field, the extent to which the ambient magnetic field is to be diminished, and the magnetic permeability of the ferromagnetic field. In accordance with a particular embodiment of the invention, the cube is constructed such that the following relationship holds:

$$\frac{t}{l}=\frac{H_o}{2B}=\frac{S}{2\mu} \qquad (1)$$

where $t$ is the thickness of the ferromagnetic material, inches,
$l$ is the length of the edges of the cube, inches,
$H_0$ is the ambient magnetic field in oersteds,
$B$ is the induction in the ferromagnetic material, gauss,
$S$ is the shielding factor, i.e., the ratio of the ambient magnetic field ($H_0$) to the magnetic field ($H_1$) internally of the cube, and
$\mu$ is the magnetic permeability of the ferromagnetic material at induction B.

Other features of the invention will be set forth in detail hereafter.

The essence of Formula 1 is that the induction B in the ferromagnetic material of the cubical space is equal to the ratio of the product of the ambient magnetic field and the length of the cube to twice the thickness of the ferromagnetic material. This is expressed as follows:

$$B=\frac{H_o l}{2t} \qquad (2)$$

Additionally, the shielding factor is equal to the ratio of twice the product of the magnetic permeability and the thickness of the ferromagnetic material to the length of the cube. This is expressed as follows:

$$S=\frac{2\mu t}{l} \qquad (3)$$

The combination of the two Formulas, 2 and 3, gives Formula 1.

By the invention, the shielded cubical space effects a reduction in the ambient magnetic field with a lesser thickness of ferromagnetic material than has heretofore been considered possible. Additionally, by the invention, the ambient magnetic field is capable of being reduced in a space which is larger than has heretofore been obtained. Of more importance, by the invention, there is provided a means for designing a shielded space which will have a predicted performance as regards the extent of shielding obtained. As a result of the ferromagnetic material being reduced in size for any desired shielding factor, the cost of providing the room is reduced. Further, by reason of the fact that the thickness of the ferromagnetic material is reduced, the space can be provided effectively without the necessity for employing heavy and cumbersome construction.

Figure 2:
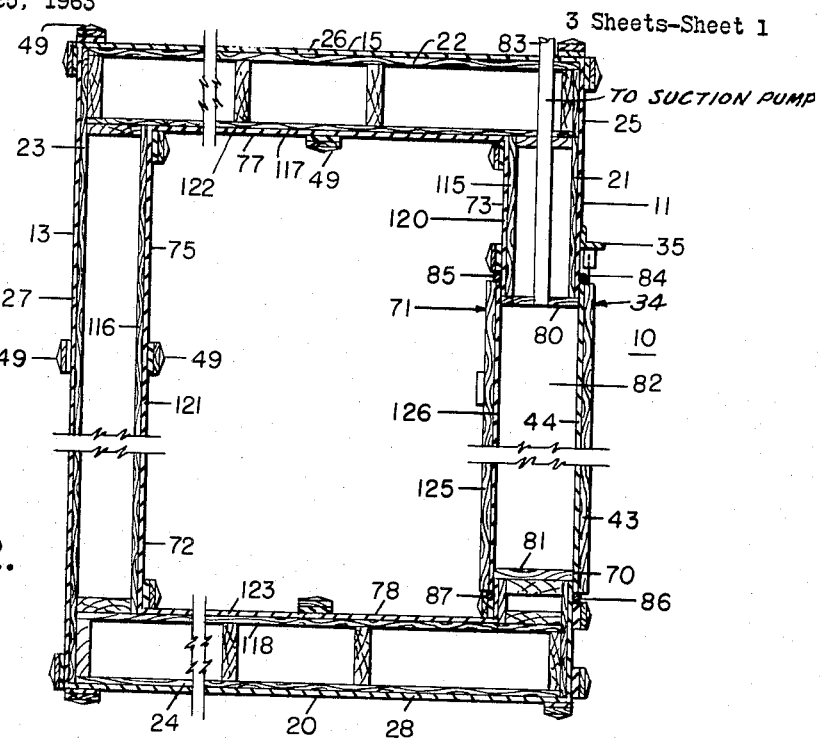
FIGURE 2 is a sectional view of the room of FIGURE 1.
Figure 1:
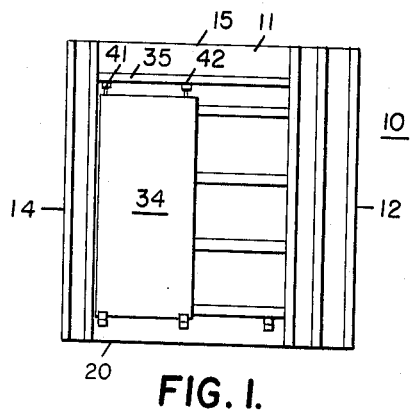
FIGURE 1 is a side elevation of a shielded room constructed in accordance with the invention.
Figure 5:
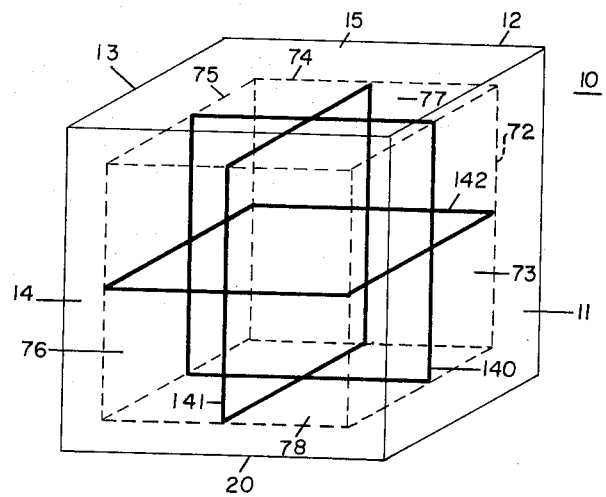
FIGURE 5 is a diagrammatic illustration of another means for providing a bucking magnetic field.

Referring now to FIGURES 1, 2, and 5, the shielded room 10 is formed of the six sides 11, 12, 13, 14, 15, and 20. For purposes of this description, the sides 11, 12, 13, and 14 may be regarded as walls and the sides 15 and 20 may be regarded as the top and bottom, respectively. Each of the sides has the same length, $l$. Each of the six sides is backed by a framework illustrated at 21, 22, 23, and 24 for the sides 11, 15, 13, and 20, respectively. This framework may be constructed of wood or of any other suitable nonmagnetic material. Over each of the six sides is an outer covering illustrated at 25, 26, 27, and 28, also for the sides 11, 15, 13, and 20, respectively. This outer covering is composed of a ferromagnetic material.

To provide access for personnel and for moving equipment into and out of the shielded room 10, door 34 is provided at side 11. The door 34 is a sliding door and is hung from track 35 by means of hangers 41 and 42. The door is constructed having an outer framework 43 of wood or other nonmagnetic material and an inner covering 44 of a ferromagnetic material. Whereas on the six sides, the framework of the nonmagnetic material is interiorly located and the ferromagnetic material is exteriorly located, on the door 34, the wooden framework 43 is exteriorly located while the ferromagnetic material is interiorly located. By this arrangement, magnetic continuity of the inner covering of the door with the outer covering of the side 11 is effected.

The outer covering of ferromagnetic material is magnetically continuous over the entire room 10. Desirably, for this purpose, the ferromagnetic material should be formed of a single piece. This single piece of the ferromagnetic material is in the shape of the cube with the exception of the door 34. However, it will usually be impractical to form a cubical shape of ferromagnetic material of sufficient size to accommodate personnel and large equipment. For example, with one type of ferromagnetic material, annealing of the material has to be effected subsequent to shaping. However, annealing requires heating to temperatures which approach the melting point of the ferromagnetic material. Thus, where the sides of the cube are of any great length, and where the length is unsupported during annealing, annealing can result in collapse of the ferromagnetic material. Accordingly, from a practical standpoint, it is more feasible to construct the room of individual pieces of the ferromagnetic material.

For construction of the room 10, the ferromagnetic material can be in the shape of sheets, or panels, and in the shape of right angles. The sheets can be in the form of rectangles and will be employed for the construction of the greater portion of the area of each of the six sides. The right angles will be employed for construction of the eight corners and the twelve edges of the cube. However, other shapes to provide for the construction of the sides, corners, and edges of the cube may be employed as desired.

Where individual pieces of ferromagnetic material, such as sheets and right angles, are employed in construction of the cube, provision must be made to insure magnetic continuity between the individual pieces. Thus, magnetic continuity must be made at the abutting edges between each of the sheets and each of the right angles and between the sheets and the right angles. Any abutting edges, regardless of how close the edges may be, will provide a break in the magnetic continuity which will adversely affect the overall shielding provided by the room. In accordance with another feature of the invention, magnetic continuity at the abutting edges of individual pieces is provided.

Figure 3:
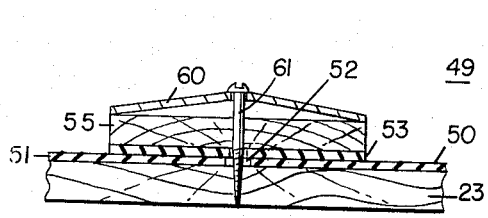
FIGURE 3 is a detailed view in section of a method of joining sections of ferromagnetic material.

Magnetic continuity at abutting edges is provided by joint construction 49. Referring to FIGURE 3 for details of the joint construction, sheets 50 and 51 are such that their edges are adjacent to each other. However, a gap 52 will exist between the abutting edges of the two sheets. The reluctance (R) of the gap will be proportional to the quotient of the length of the gap ($lg$) to the area ($Ag$) of the abutting edges. This is expressed mathematically, as follows:

$$R \alpha \frac{lg}{Ag} \qquad (4)$$

By the invention, the area of the abutting edges is increased with consequent decrease in the reluctance of the gap. Increase in the area of the abutting edges is effected by placing over the gap a strip 53 of ferromagnetic material, which may be the same ferromagnetic material as that of the sheets 50 and 51. Any increase in the area will effect a reduction in the reluctance of the gap. Preferably, the area should be increased by a factor of at least ten.

Still referring to FIGURE 3, the strip 53 of ferromagnetic material is backed by the batten 55, which batten may be of wood or other nonmagnetic material. Positione dagainst the batten is a spring clamp 60 through which screw 61 passes. The screw 61 is screwed through the strip 53 and within the gap 52 between the panels 50 and 51 into the framing, framing 23 being shown for purposes of illustration. By tightening the screw 61, tension is placed against the spring clamp 60 which pushes the batten 55 and the strip 53 against the sheets 50 and 51 to provide a tight fit. Both the screw and the spring clamp are made of nonmagnetic material.

The following expression can be used to evaluate the effect of the joint construction:

$$lg = (wl_m/\mu t)(Rg/Rm) \qquad (5)$$

where $lg$ is the distance in inches between the strip 53 and the sheets, $w$ is the length in inches between the gap 52 and the end of the strip 53, i.e., the width of the strip 53 is $2w$, $l_m$ is the length in inches of the sheets, $\mu$ is the magnetic permeability of the ferromagnetic material, $t$ is the thickness in inches of the sheets and the strip 53, and $Rg/Rm$ is the ratio of the gap reluctance to the reluctance of the ferromagnetic material.

A similar arrangement, as described in FIGURE 3 for the sheets, is employed at each of the eight corners and the twelve edges of the cube to provide joining of the right angles with each other and with the sheets forming the sides of the cube.

In accordance with another feature of the invention, means are provided to insure magnetic continuity of the ferromagnetic material on the door to the cube with the ferromagnetic material on the side of the cube. Referring particularly to FIGURE 2, at the opening 70 in the side 11, which opening is covered by the door 34, an interior door 71 is provided. Further, interiorly of the cube 10 there is provided another cube 72, which cube will be referred to in further detail hereinafter. This cube, also referring to FIGURE 5, is formed of six sides 73, 74, 75, 76, 77, and 78. For purposes of this description, the sides 73, 74, 75, and 76 may be regarded as walls and the sides 77 and 78 may be regarded as the top and bottom, respectively. The sides support the door 71. There are provided within the cube 10 upper and lower stud members 80 and 81 which stud members are impermeable to the passage of air. Also provided are side stud members at the top and bottom of the doors. These side studs are also impermeable to the passage of air. There is thus provided, as shown in FIGURE 2, an air impermeable chamber 82 comprising doors 34 and 71, the stud members 80 and 81, and the side stud members. A conduit 83 leads exteriorly of the cube 10 to the chamber 82. Upon evacuation of this chamber by pumping the air out through the conduit 83, the door 34 is caused to be pressed tightly inwardly of the cube. In so doing, the ferromagnetic material 44 is pressed tightly against the ferromagnetic material 25 which forms the exterior side 11 of the cube. Thus, magnetic continuity of the ferromagnetic material of the door 34 with the wall 11 is effected. To assist in maintenance of the lowered pressure in the chamber 83, gaskets 84, 85, 86 and 87 are provided at the edges of the doors 34 and 71. For opening of the doors, the pressure within the chamber can be equalized with the pressure interiorly and exteriorly of the cube.

In the practice of the invention, the particular type of ferromagnetic material and the thickness and length of the material are selected in order that the desired shielding factor as set forth in Formula 1 is obtained. The ambient magnetic field, $H_0$, will be known or can be measured. Further, the size of the room, i.e., the length of the sides of the cube, will be fixed by considerations of the number of personnel and the size of the equipment that will be within the room. Further, the shielding factor will also be known as set by considerations of the extent to which the internal field is to be reduced. Accordingly, referring to Formula 1, the only unknowns will be the induction in and the magnetic permeability of the ferromagnetic field and the thickness of the ferromagnetic material. From knowledge of the variation in magnetic permeability with thickness and induction of the ferromagnetic material to be employed in construction of the cube, values can be selected which will satisfy Formula 1. Ordinarily, the variation in magnetic permeability with thickness and induction of various ferromagnetic materials are available from the manufacturers of these materials or can be obtained from published tables. On the other hand, if this information is not available, the variation in magnetic permeability with thickness and induction of any particular ferromagnetic material may be determined by standard methods. These methods are sufficiently known that a detailed description thereof is not required.

Figure 8:
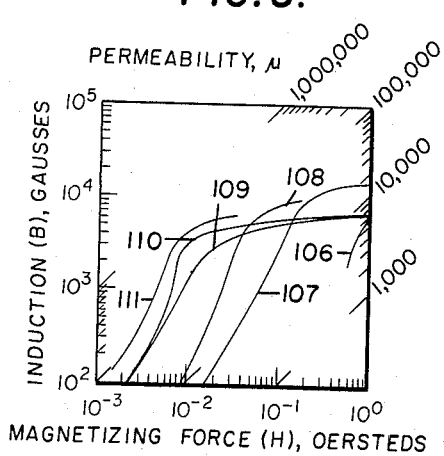
FIGURE 8 is a graph illustrating the relationship between magnetizing force, permeability, and induction for various ferromagnetic materials.
Figure 6:
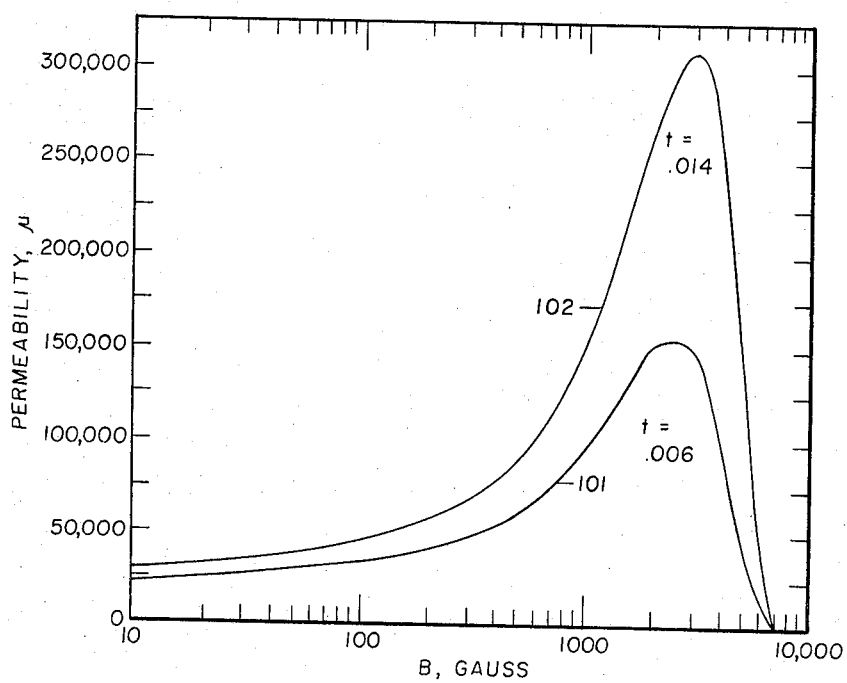
FIGURE 6 is a graph setting forth the variation in permeability with induction of various thicknesses of a ferromagnetic material.
Figure 7:
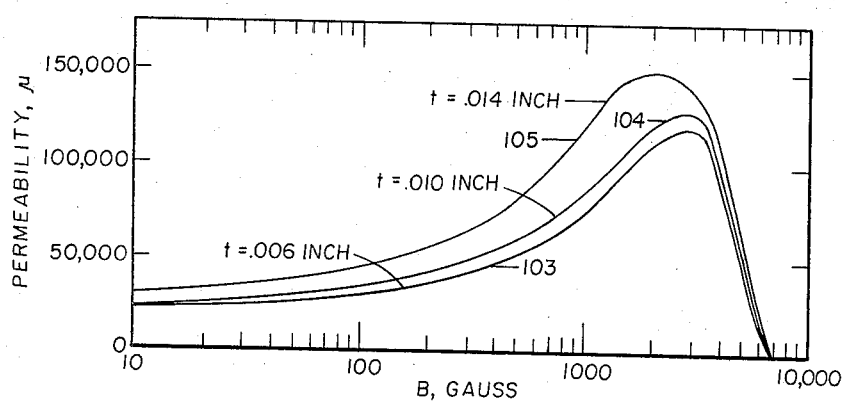
FIGURE 7 is a graph setting forth the variation with inductance of various thickness of another ferromagnetic material.

FIGURES 6, 7 and 8 show the variation in permeability with thickness and induction of various ferromagnetic materials which may be employed in the practice of the invention. In FIGURE 6, the ferromagnetic material is "4–79 Permalloy" which contains 4% of molybdenum, about 79% nickel, and 17% iron by weight. The curves 101 and 102 are for thickness of the ferromagnetic material of .006 and .014 inch, respectively. In FIGURE 7, the ferromagnetic material is "Mumetal" which contains about 77% nickel, about 5% copper, about 1.5% chromium, and about 15% iron, by weight. The curves 103, 104, and 105 are for thicknesses of the ferromagnetic material of .006, .010, and .014 inch, respectively. In FIGURE 8, the magnetizing force is given along with the permeability and the induction of the ferromagnetic material. This type of graph is a conventional B, $\mu$, H curve and can be employed for obtaining the appropriate value of $\mu$ for use in Formula 3. Curves 106, 107, 108, 109, 110, and 111 are for "3% Si-Fe," "3% Si-Fe-Oriented," "49% Ni-Al 4750," "79% Ni-Mumetal," "79% Ni-Moly Permalloy," and "79% Ni-Supermalloy."

Occasionally, depending upon the type of ferromagnetic material and the shielding factor desired, taken in conjunction with the ambient magnetic field, the desired shielding factor cannot be attained. Stated otherwise, the ferromagnetic material may not be capable at any thickness of providing the desired shielding of the ambient magnetic field. Occasionally, also, whereas the ferromagnetic material may be capable of effecting the desired shielding of the ambient magnetic field, the desired shielding factor cannot be attained with a practical thickness of the material. In such cases, in accordance with another feature of the invention, one or more other cubes may be provided within the first cube. The total shielding factor will be given by the formula:

$$S = S_1 \left[ S_2 \left(1 - \frac{l_1^3}{l_2^3}\right) \right] \left[ S_3 \left(1 - \frac{l_2^3}{l_3^3}\right) \right] \cdots \left[ S_n \left(1 - \frac{l_n - 1^3}{l_n^3}\right) \right] \quad (6)$$

where $S_1$, $S_2$, $S_3$, and $S_n$ are the shielding factors for the cubes, $S_1$ and $S_n$ being the shielding factor for the innermost and outermost cubes, respectively, and $l_1$, $l_2$, $l_3$, and $l_n$ are the lengths of the sides of the cubes, $l_1$ and $l_n$ being the lengths of the sides for the innermost and outermost cubes, respectively.

For design of each of any one or more inner cubes, the ambient magnetic field within the outer cube is the ambient magnetic field which would be substituted in Formula 1 for the next inner cube. An inner cube, in accordance with the invention, is disclosed and set forth as indicated hereinabove in FIGURE 2.

Referring to FIGURE 2 again, the four sides of the inner cube which are shown are 73, 75, 77, and 78. These sides, similarly to the sides of the outer cube 11, are backed by frameworks 115, 116, 117, and 118, respectively. This framework will be constructed of material similar to that employed for the framework of the outer cube 11. Over each of the sides of the inner cube will be a covering of a ferromagnetic material 120, 121, 122, 123, respectively. Similarly, the remaining two sides of the inner cube (not shown) will also be formed of a framework with a covering of ferromagnetic material.

The door 71 is formed of an inner framework 125 which may be made of the same material impermeable to air as the framework 43 of door 34. This door, unlike door 34 which is a sliding door, is a swinging door and swings on suitable hinges (not shown). Further, the door 71 has an inner covering of ferromagnetic material 126. The ferromagnetic material 126 is positioned exteriorly of the door 71 whereas the ferromagnetic material on the six sides of the inner cube is located interiorly of the framework. By this arrangement, magnetic continuity of the ferromagnetic material 126 with the ferromagnetic material 120 on the side 73 is effected.

Regardless of the design of the cube or the design of another or other inner cubes, there will always be within any cube a residual magnetic field. This is in accordance with the formulas given above in relation to the shielding factor as being a ratio. Stated otherwise, fractional reduction of the ambient magnetic field cannot mathematically result in a value of zero for the magnetic field internally of a cube. However, the internal field may be reduced in many instances to a value which may be considered to be zero for practical purposes. On the other hand, the thickness and kind of ferromagnetic material that would be required for this purpose might be impractical. Under these circumstances, a desired residual magnetic field may be attained within a cube by providing a bucking field. The bucking field is provided by inducing a remanent magnetism in the ferromagnetic material and is employed where the residual field in the cube is undesirably high or undesirably low or in an undesired direction. The relationship of the bucking field to the internal field, the ambient field, and the shielding factor of the cube is:

$$H_i = \frac{\vec{H_0}}{S} \pm \vec{H_b} \quad (7)$$

where $H_i$ is the internal magnetic field,
$H_0$ is the ambient field,
$H_b$ is the bucking field, and
S is the shielding factor of the cube.

The bucking field can be provided to obtain any desired magnetic field in the cube with respect to either magnitude or direction. Thus, a space with a controlled magnetic field is readily attained. The magnitude of this field will be limited to the coercive field of the ferromagnetic material. Stated otherwise, any value of the field may be provided up to the coercive field of the ferromagnetic material. The coercive field of any ferromagnetic field is known or can be determined by standard means.

The bucking field may be provided by any desired procedure. Thus, the bucking field can be induced by placing a temporary magnetic field in the cube which permanently magnetizes the cube such that the resulting magnetic field in the room gives the desired magnetic conditions. For example, the bucking field may be obtained by passing direct current through a coil of wire within the cube. Additionally, the bucking field can be obtained by means of a coil of wire entirely surrounding each of the sides of the cube oriented in the three axes of the cube.

Figure 4:
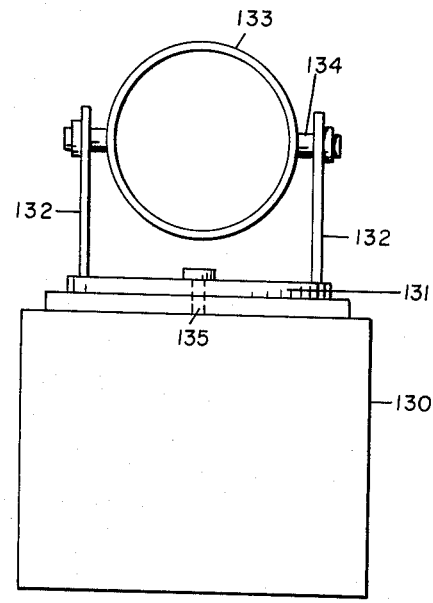
FIGURE 4 is a diagrammatic illustration of a coil for providing a bucking magnetic field.

Referring to FIGURE 4, there is illustrated a coil which may be used to obtain a bucking field within the cube. The coil comprises a lower base 130, an upper base 131 having a pair of support arms 132. A coil 133 provided with a rotatable shaft 134 is mounted on the arms 132. The upper base 131 is pivoted on the lower base 130 by means of shaft 135. It will be seen that by rotation of the base 131 around the shaft 135 and rotation of the coil 133 around the shaft 134 that the coil is universally mounted. Thus, the coil may be positioned to provide direction of bucking field within the shielded cube. Suitable means, not shown, are provided for passing direct current through the coil 133.

Referring to FIGURE 5, there are provided about the inner cube 72 three coils 140, 141, and 142. Each of thesse coils is mutually perpendicular to the other. They therefore provide a means for imposing a temporary magnetic field by passage of direct current through each of them such that this field will have the direction and magnitude to provide the desired bucking field within the cube 72. Current is supplied to each of the coils in any desired manner and by any desired means (not shown).

The magnitude of the bucking field can be determined by Formula 7 above. On the other hand, it is not easily determined as to what direct current should be applied to obtain the necessary temporary magnetic field to provide the proper bucking field. This difficulty arises primarily because the response of the ferromagnetic material employed in the construction of the cube to the temporary magnetic field depends upon the magnetic history of the ferromagnetic material. On the other hand, by means of the formula it is possible to approximate closely the necessary current. On the other hand, with a trial and error manipulation, the necessary temporary field to provide the desired bucking field can be obtained.

The following is a specific example of the design of a shielded room. Assume that it is desired to provide a room which is shielded from the earth's magnetic field, which is 0.5 oersted and that the shielding factor will be 36. Assume also that it is desired that the room, i.e., the cube, have a length of 50 inches. Assume, further, that it is desired that this room be constructed employing Mumetal as the ferromagnetic material. Referring to Formula 1, the unknowns remaining in this formula will be the thickness, the induction, and the permeability of the ferromagnetic material. Referring to FIGURE 6, Mumetal having a thickness of .006 has a permeability of 150,000 at an induction of 2083 gauss. Employing the thickness of .006, the permeability of 150,000, and the induction of 2083 gauss, Formula 1 will be satisfied. Accordingly, the shielded room can be constructed where the length of the cube is 50 inches and the thickness of the ferromagnetic material, namely Mumetal, is .006.

The shielded room may be designed in another manner using Formula 1. Assume that it is desired to provide a room which is shielded from a known magnetic field and the length of the room and the shielding factor are specified. Knowing the magnetic field, a value for the permeability of a ferromagnetic material may be obtained from a B, $\mu$, H curve such as FIGURE 8. Knowing the shielding factor, the permeability, and the length of the room, $t$ can be calculated from Formula 3.

A specific example of a room formed of two cubes will be indicated by the following.

This room effects shielding from the earth's magnetic field and has a shielding factor of 700 in accordance with Formula 6. The outer cube has a length of 108.75 inches and the inner cube has a length of 96 inches. Mumetal was employed and the thicknesses of the inner cube and the outer cube were 0.060 and 0.030 inch, respectively. The estimated permeability of the inner cube is 29,000 and that of the outer cube is 110,000.

For further details with respect to the construction of the shielded room, reference is hereby made to the article in the Journal of Geophysical Research, volume 67, March 1962, No. 3, pp. 1117–1121, by Bob J. Patton and John L. Fitch.

In the description heretofore given, the conduit 83 leads to a suction pumps outside the room and not shown. The point where the conduit passes through the wall 12 will provide a break in the magnetic continuity of the outside shield. Ordinarily, this break is insufficient to provide any significant adverse effect on the shielding characteristics of the room. On the other hand, where the room is formed of an inner shield and an outer shield, the conduit will pass through the outer shield but not the inner shield. Thus, in these circumstances, any break in magnetic continuity of the outside shield, even though insignificant, will be corrected by the presence of an inner shield.

Having thus described my invention, it will be understood that such description has been given by way of illustration and example and not by way of limitation, reference for the latter purpose being had to the appended claims.

I claim:

1. An enclosed spaced under the influence of an ambient magnetic field wherein the effect of said ambient magnetic field internally of said space is diminished comprising a cube of a ferromagnetic material, which cube of ferromagnetic material has characteristics which satisfy the formula:

$$\frac{t}{l} = \frac{H_0}{2B} = \frac{S}{2\mu}$$

where $t$ is the thickness of the ferromagnetic material in inches,
$l$ is the length of the edge of the cube in inches,
$H_0$ is the ambient magnetic field in oersteds,
B is the induction in the ferromagnetic material in gauss,
S is the shielding factor, and
$\mu$ is the magnetic permeability at induction B.

2. The enclosed space of claim 1 wherein S has a value of at least 36 and $H_0$ has a value of at least 0.5 oersted.

3. The enclosed space of claim 1 wherein S has a value of at least 700 and $H_0$ has a value of at least 0.5 oersted.

4. The enclosed space of claim 1 where a remanent magnetism of a predetermined magnitude and predetermined direction has been induced upon said ferromagnetic material.

5. The enclosed space of claim 1 wherein said cube is formed of sheets of a ferromagnetic material having magnetic continuity.

6. The enclosed space of claim 1 wherein said cube is formed of sheets of a ferromagnetic material and has means for providing magnetic continuity of said sheets of ferromagnetic material including a strip of ferromagnetic material overlapping abutting sheets of said ferromagnetic material and held in close contact with said sheets of said ferromagnetic material.

7. The enclosed space of claim 1 wherein said cube of ferromagnetic material is provided with means comprising an opening in one wall of said cube for access internally of said cube, a door covering said opening means internally of said cube and a door covering said opening means externally of said cube, one of said doors being formed of a ferromagnetic material and on being closed being in contact around its periphery with said ferromagnetic material of said cube, and means for providing a reduced pressure between said doors to effect magnetic continuity between the ferromagnetic material of said one of said doors and said wall of said cube.

8. The enclosed space of claim 1 wherein $t$ has a value of 0.006 inch, $l$ has a value of 50 inches, $H_0$ has a value of 0.5 oersted, B has a value of 2083 gauss, S has a value of at least 36, and $\mu$ has a value of 150,000, and the ferromagnetic material is an alloy containing about 77 percent by weight of nickel, about 5 percent by weight of copper, about 1.5 percent by weight of chromium, and about 15 percent by weight of iron.

9. An enclosed space under the influence of an ambient magnetic field wherein the effect of said ambient magnetic field internally of said space is diminished comprising a cube of a ferromagnetic material, means comprising an opening in one wall of said cube for access internally of said cube, a door covering said opening means internally of said cube and a door covering said opening means externally of said cube, one of said doors being formed of a ferromagnetic material and on being closed being in contact around its periphery with said ferromagnetic material of said cube, and means for providing a reduced pressure between said doors to effect magnetic continuity between the ferromagnetic material of said one of said doors and said wall of said cube.

10. An enclosed space under the influence of an ambient magnetic field wherein the effect of said ambient magnetic field internally of said space is diminished comprising a room of a ferromagnetic material, means comprising an opening in one wall of said room for access internally of said room, and a door covering said opening means internally of said room and a door covering said opening means externally of said room, one of said doors being formed of a ferromagnetic material and on being closed being in contact around its periphery with said ferromagnetic material of said room, and means for providing a reduced pressure between said doors to effect magnetic continuity between the ferromagnetic material of said one of said doors and said wall of said room.

11. An enclosed space under the influence of an ambient magnetic field wherein the effect of said ambient magnetic field internally of said space is diminished comprising a first cube of a ferromagnetic material and a second cube of ferromagnetic material externally of said first cube, which cubes of ferromagnetic material have characteristics which satisfy the formula:

$$\frac{t}{l} = \frac{H_0}{2B} = \frac{S}{2\mu}$$

where $t$ is the thickness of the ferromagnetic material of each cube in inches,
$l$ is the length of the edge of each cube in inches,
$H_0$ is the ambient magnetic field of each cube in oersteds,
B is the induction in the ferromagnetic material of each cube in gauss,
$\mu$ is the magnetic permeability of the ferromagnetic material of each cube at induction B, and
S is the shielding factor and has the value given by the formula:

$$S = S_1\left[S_2\left(1 - \frac{l_1^3}{l_2^3}\right)\right]$$

where $S_1$ is the shielding factor for the first cube,
$S_2$ is the shielding factor for the second cube,
$l_1$ is the length of the edge of the first cube in inches, and
$l_2$ is the length of the edge of the second cube in inches.

12. The enclosed space of claim 11 wherein $t$ has a value of 0.060 inch for the first cube and $t$ has a value of 0.030 inch for the second cube, $l$ has a value of 96 inches for the first cube and has a value of 108.75 inches for the second cube, $H_0$ for the second cube has a value of at least 0.5 oersted, B has a value of 29,000 for the first cube and has a value of 110,000 for the second cube, and S has a value of 700, and the ferromagnetic material is an alloy containing about 77 percent by weight of nickel, about 5 percent by weight of copper, about 1.5 percent by weight of chromium, and about 15 percent by weight of iron.

References Cited by the Examiner

UNITED STATES PATENTS

| | | | |
|---|---|---|---|
| 2,026,060 | 12/1935 | Pratt | 174—35 X |
| 2,200,678 | 5/1940 | Pratt | 174—35 |
| 2,388,848 | 11/1945 | Howe | 174—35 |
| 2,757,225 | 7/1956 | Dunn | 174—35 |
| 2,838,592 | 7/1958 | Feketics | 174—35 |
| 2,853,541 | 9/1958 | Lindgren | 174—35 |
| 2,860,176 | 11/1958 | Lindgren | 174—35 |

OTHER REFERENCES

"Design of a Room-Size Magnetic Shield," Patton et al., published in Journal of Geophysical Research, vol. 67, No. 3, March 1962 (pages 1117–1121).

JOHN F. BURNS, *Primary Examiner.*

JOHN P. WILDMAN, E. JAMES SAX, *Examiners.*